United States Patent
Gunda et al.

(10) Patent No.: US 12,192,306 B2
(45) Date of Patent: Jan. 7, 2025

(54) METHOD TO PROVIDE SLA BASED ACCESS TO CLOUD DATA IN BACKUP SERVERS WITH MULTI CLOUD STORAGE

(71) Applicant: EMC IP Holding Company LLC, Hopkinton, MA (US)

(72) Inventors: Kalyan C. Gunda, Bangalore (IN); Jagannathdas Rath, Bangalore (IN); Santi Gopal Mondal, Bangalore (IN); Arun Vishnu Pk, Bangalore (IN); Veera Venkata Prasad Jagarlamudi, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 11 days.

(21) Appl. No.: 17/350,203

(22) Filed: Jun. 17, 2021

(65) Prior Publication Data

US 2022/0407931 A1 Dec. 22, 2022

(51) Int. Cl.
*H04L 67/61* (2022.01)
*H04L 9/40* (2022.01)
*H04L 41/50* (2022.01)
*H04L 67/1023* (2022.01)
*H04L 67/1097* (2022.01)
*H04L 67/53* (2022.01)

(52) U.S. Cl.
CPC .......... *H04L 67/61* (2022.05); *H04L 41/5096* (2013.01); *H04L 63/102* (2013.01); *H04L 67/1023* (2013.01); *H04L 67/1097* (2013.01); *H04L 67/53* (2022.05)

(58) Field of Classification Search
CPC . H04L 67/322; H04L 41/5096; H04L 63/102; H04L 67/1023; H04L 67/1097; H04L 67/20
See application file for complete search history.

(56) References Cited

U.S. PATENT DOCUMENTS

| | | | |
|---|---|---|---|
| 10,042,918 B2 * | 8/2018 | Kleinschnitz, Jr. | G06F 16/22 |
| 10,296,383 B2 * | 5/2019 | Singh | G06F 9/46 |
| 11,068,162 B1 * | 7/2021 | Meister | G06F 3/0638 |
| 2002/0049778 A1 * | 4/2002 | Bell | G06Q 10/00 |
| 2002/0103969 A1 * | 8/2002 | Koizumi | G06F 3/0653 711/114 |
| 2003/0009444 A1 * | 1/2003 | Eidler | G06F 21/6245 |
| 2003/0055971 A1 * | 3/2003 | Menon | H04L 67/1008 709/226 |

(Continued)

*Primary Examiner* — Nicholas R Taylor
*Assistant Examiner* — Tania M Pena-Santana
(74) *Attorney, Agent, or Firm* — WOMBLE BOND DICKINSON (US) LLP (57) ABSTRACT

The disclosure provides a system, computer readable medium, and computer-implemented method for managing data access. The method includes obtaining a data access request from a requestor for client data redundantly stored in at least two storage providers that are unknown to the requestor; identifying a service level objective for servicing the data access request; ranking the at least two storage providers based on the service level objective to identify one of the at least two storage providers to service the data access request; and providing the requestor with access to a copy of the client data using the one of the at least two storage providers.

18 Claims, 7 Drawing Sheets

(56) References Cited

U.S. PATENT DOCUMENTS

| | | | | |
|---|---|---|---|---|
| 2011/0213712 A1* | 9/2011 | Hadar | ............... | G06Q 30/04 |
| | | | | 705/34 |
| 2013/0159637 A1* | 6/2013 | Forgette | ............ | G06F 3/067 |
| | | | | 711/E12.001 |
| 2015/0331465 A1* | 11/2015 | Slik | ...................... | G06F 1/28 |
| | | | | 713/300 |
| 2015/0331774 A1* | 11/2015 | Slik | ............... | G06F 11/3034 |
| | | | | 714/6.23 |

* cited by examiner

METHOD TO PROVIDE SLA BASED ACCESS TO CLOUD DATA IN BACKUP SERVERS WITH MULTI CLOUD STORAGE

FIELD OF THE INVENTION

Embodiments of the present invention relate generally to data storage systems. More particularly, embodiments of the invention relate to systems and methods to achieve consistent access to data.

BACKGROUND

Users of computing devices may rely on being able to access previously stored data. For example, the users may store contact information for colleagues, financial account information, travel plans, etc. in data structures stored in the computing devices. If the computing devices become inaccessible or the data structures becomes inaccessible for other reasons, the users of the computing devices may be unable to access their previously stored data.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In general, embodiments of the invention relate to methods and systems for managing access to data in a distributed system. The distributed system may include devices used by users (e.g., clients) and devices in which data is stored for future accessibility (e.g., storage providers). An orchestrator (e.g., a storage orchestrator) may manage data access within the distributed system to improve the likelihood that data access goals (e.g., defined by service level agreements or other policies) are met.

The storage providers may not be accessible at all points in time. For example, the storage providers may be inaccessible while undergoing maintenance, when in an error state, or for other reasons. Consequently, any single copy of data in a storage provider that is not redundantly stored in other storage providers may still place the system at significant risk of failing to meet data access goals.

In an embodiment, the storage orchestrator automatically and redundantly stores copies of data from the clients in multiple storage providers without being prompted to do so by the clients. This process may be transparent to the clients which may be unaware of the storage providers. The storage orchestrator may dynamically select in which of the storage providers to redundantly store copies (e.g., store separate, duplicative copies) of data based on the operational performance of the storage providers and/or cost associated with such storage.

When the data is redundantly stored, the storage orchestrator may record these storage locations and update in-memory data structures reflecting in which of the storage providers various portions of data are redundantly stored. The portions of data may correspond to, for example, disk images, files, all data corresponding to a computing device, portions of files, groups or individuals blocks, etc. Doing so may enable the storage orchestrator to quickly ascertain where copies of data requested to be read are stored.

When a client requests access to stored data, the storage orchestrator may dynamically select from which storage provider to read a copy of the stored data. When making the selection, the storage provider may take into account the operational performance of the storage providers, in which tier of storage the copies of the data are stored in the respective storage providers, and the cost for reading the stored data. The storage provider may use the aforementioned information to (i) eliminate some of the storage providers that are incapable of meeting storage access requirements and (ii) rank the remaining (or all) storage providers with their respective capabilities of providing access to the stored data.

Once selected, the storage orchestrator may read a copy of the data from the selected storage provider and provide the client with access to the data using the read copy of the data.

To support the aforementioned processes of storing and reading data using storage providers, the storage orchestrator may monitor the operational performance of the storage providers and cost for using the storage providers. The storage orchestrator may use the operational performance and cost associated with the storage providers to rank the storage providers across multiple metrics. These metrics, operational performance, and/or cost information may be stored in in-memory data structures to facilitate rapid evaluation the storage providers for data access purposes.

By implementing a system, as discussed above, one embodiments of the invention may protect clients from losing data due to events (e.g., natural disaster) even though the data had been stored in a storage provider. For example, by automatically redundantly storing copies of the data in multiple locations, an event impacting a single location may not render all copies of the data inaccessible.

Further, by redundantly storing copies of data in multiple locations, the cost and availability for accessing the data may be managed by dynamically selecting form which location to retrieve copies of the data. Consequently, a system may automatically, without needing to configure entities that wish to store and/or access stored data, enable access to such data in a manner that prevents bottlenecking, increases availability, and manages cost automatically.

Additionally, the system discussed herein may be broadly applicable to a range of storage providers including public cloud providers (e.g., cloud services provided under contract by hardware owned by another entity from that which utilizes the cloud services), private cloud providers (e.g., cloud services provided by hardware owned by the utilizer), and hybrid environments (e.g., utilizers that could utilize private and public cloud providers). Any of the cloud providers may provide the storage providers using any number and type of protocol for storing and providing access to stored data. By utilizing a storage orchestrator to manage the selection of where to store and read data, clients may not need to be aware of the environment in which they operate to successfully store and/or access data in these environments. For example, the clients may not need to know where to store data, the cost associated with storing data, the relative strengths and weaknesses for storing and/or reading data from different storage providers, etc.

In accordance with embodiments, a computer-implemented method for managing data access is provided. The computer implemented method includes obtaining a data access request from a requestor for client data redundantly stored in at least two storage providers that are unknown to the requestor; identifying a service level objective for servicing the data access request; ranking the at least two storage providers based on the service level objective to identify one of the at least two storage providers to service the data access request; and providing the requestor with access to a copy of the client data using the one of the at least two storage providers.

In accordance with embodiments, a non-transitory machine-readable medium is provided that has instructions stored therein, which when executed by a processor, cause the processor to perform operations for managing data access. The operation include obtaining a data access request from a requestor for client data redundantly stored in at least two storage providers that are unknown to the requestor; identifying a service level objective for servicing the data access request; ranking the at least two storage providers based on the service level objective to identify one of the at least two storage providers to service the data access request; and providing the requestor with access to a copy of the client data using the one of the at least two storage providers.

In accordance with embodiments, a data processing system for managing data access is provided. The data processing system includes a processor and a memory coupled to the processor. The memory is for storing instructions, which when executed by the processor, cause the processor to perform operations. The operations include obtaining a data access request from a requestor for client data redundantly stored in at least two storage providers that are unknown to the requestor; identifying a service level objective for servicing the data access request; ranking the at least two storage providers based on the service level objective to identify one of the at least two storage providers to service the data access request; and providing the requestor with access to a copy of the client data using the one of the at least two storage providers.

Figure 1:
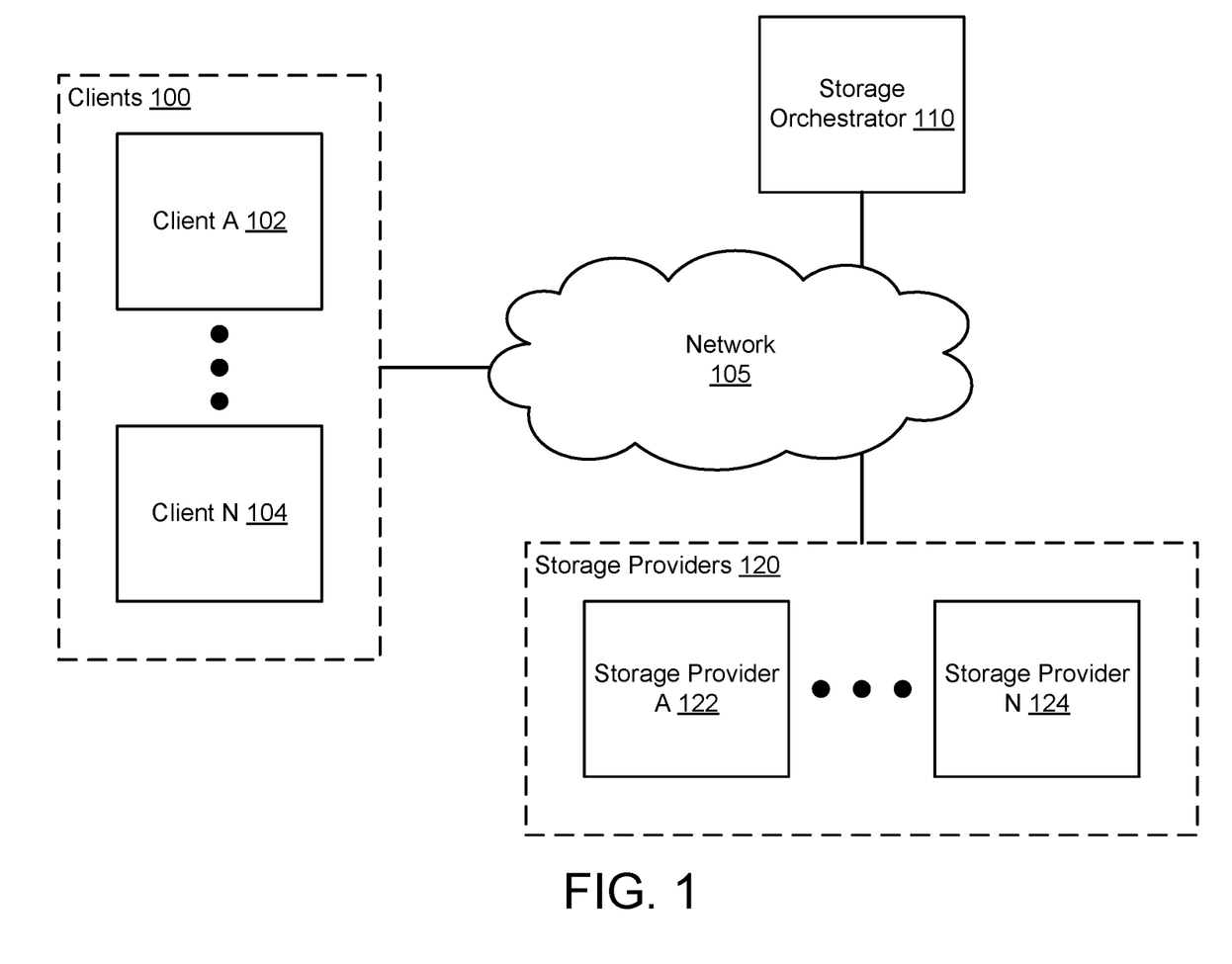
FIG. 1 is a block diagram illustrating a storage system according to one embodiment.

FIG. 1 is a block diagram illustrating a system according to one embodiment of the invention. Referring to FIG. 1, the system includes, but is not limited to, one or more clients 100 communicatively coupled to one or more storage providers 120 and storage orchestrator 110 over network 105.

Clients 102-104 may be implemented using any type of computing device such as a host or server, a personal computer (e.g., desktops, laptops, and tablets), a "thin" client, a personal digital assistant (PDA), a Web enabled appliance, or a mobile phone (e.g., Smartphone), or any other type of data processing device or system. Any of clients 102-104 may be a portion of a primary storage system (e.g., local data center) that provides data storage and/or access services to other devices (e.g., other types of clients, other computing device installations, etc.).

Clients 102-104 may provide computer implemented services to users thereof and/or other computing devices operably connected to them. The computer implemented services may include any type and quantity of services including, for example, database services, instant messaging services, video conferencing services, etc. When providing the aforementioned services, data that is relevant to the users or other devices may be locally stored in clients 102-104. If this data becomes inaccessible due to, for example, an error in a local storage system of clients 102-104, then clients 102-104 may be unable to provide computer implemented services desired by the users and/or other devices.

To reduce the likelihood of clients 102-104 being unable to provide desired computer implemented services, clients 102-104 may periodically back up their data (e.g., client data). Backing up data may include storing a copy of the data (or other data usable to reconstruct or otherwise obtain a copy of the data in the future) in a second device (e.g., a storage provider). Such backed up data may be usable to restore the operation of all, or a portion, of the function of clients 102-104 to a previous state (e.g., a state associated with the backed up data).

The second device in which a copy of the backed up data is stored may be in a separate fault domain from the client device backing up its data. For example, the second device may be in a separate location that is unlikely to be subject to the same conditions (which may lead to data inaccessibility) as the client.

In an embodiment, clients 100 are unaware of storage providers 120. Rather, clients 100 may only be programmed to interact with storage orchestrator 110 when storing data. Thus, only storage orchestrator 110 may actively manage to in which storage provider data from clients 100 is stored. By doing so, the system of FIG. 1 may dynamically add and remove storage providers without needing to reprogram or otherwise modify the operation of clients 100.

Clients 100 may also request copies of data (client data or data from other entities) previously stored in storage providers 120. In one embodiments, clients 100 do so by sending requests to storage orchestrator 110 which provides a copy of the data. Clients 100 may be unaware of in which of storage providers 120 any data is stored.

Storage orchestrator 110 may be implemented using any type of computing device such as a host or server, a personal computer (e.g., desktops, laptops, and tablets), a "thin" client, a personal digital assistant (PDA), a Web enabled appliance, or a mobile phone (e.g., Smartphone), etc.

Storage orchestrator 110 may provide data access management services. Data access management services may include (i) selecting in which storage providers to redundantly store copies of data (e.g., from clients 100), (ii) selecting from which storage providers to read copies of previously stored data, and (iii) servicing data access requests using the selected storage providers. Storage orchestrator 110 may make such selections to meet data access goals. For additional details regarding storage orchestrator 110, refer to FIG. 2.

Storage providers 120 may be implemented using any type of computing device such as a host or server, a personal computer (e.g., desktops, laptops, and tablets), a "thin" client, a personal digital assistant (PDA), a Web enabled appliance, or a mobile phone (e.g., Smartphone), etc. Storage providers 120 may be implemented as, for example, servers or a cluster of one or more servers (e.g., cloud servers). For example, any of storage providers 122-124 be implemented using a storage server used for various different purposes, such as to provide computing devices with access to shared data and/or to back up (or restore) data (e.g., mission critical data, data that is relevant to users, etc.). Storage providers 120 may provide storage services to computing devices via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fiber channel (FC) protocol, etc. Storage providers 120 may further provide storage services via an object-based protocol and Hadoop distributed file system (HDFS) protocol.

Storage providers 120 may implement any number of data processing operations when storing data including, for example, deduplication and compression. Any of the operations may be implemented in hardware and/or software.

Additionally, storage providers 120 may monitor and/or report, to storage orchestrator 110, information regarding their respective performance during operation and/or cost of operation. For example, some of storage providers 120 may be implemented as shared infrastructure (e.g., public clouds) which may provide services to other devices at various cost levels while other storage providers 120 may be private infrastructure for which storing data from clients 100 does not incur incremental cost.

Network 105 may be any type of networks such as a local area network (LAN), a wide area network (WAN) such as the Internet, a fiber network, a storage network, or a combination thereof, wired or wireless. Clients 100, Storage orchestrator 110, and storage providers 120 may be in physical proximity or may be physically remote from one another.

While illustrated in FIG. 1 as included a limited number of specific components, a system in accordance with one or more embodiments may include fewer, additional, and/or different components.

Figure 2:
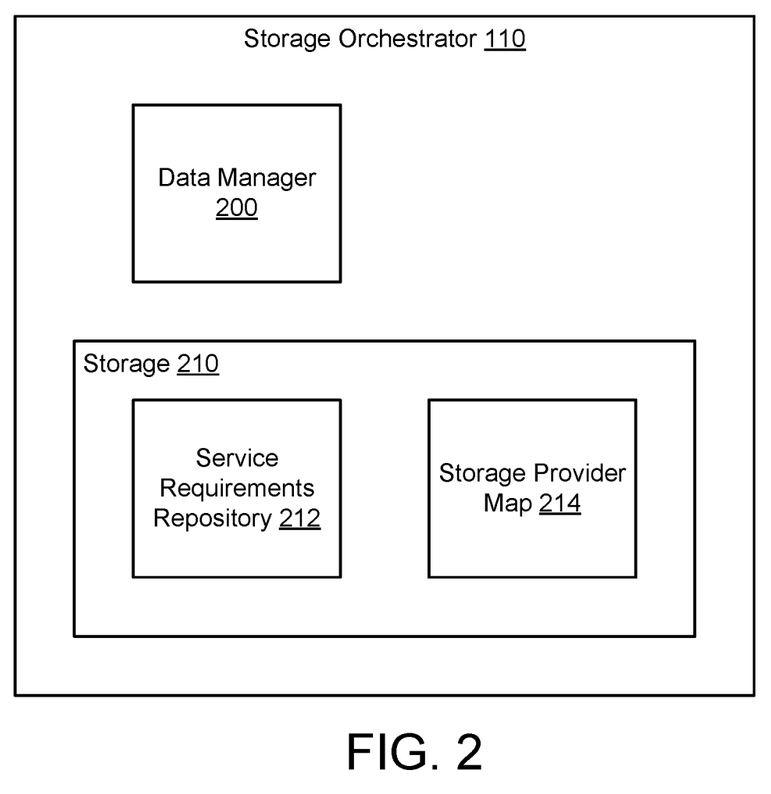
FIG. 2 is a block diagram illustrating a storage orchestrator according to one embodiment.

FIG. 2 is a block diagram illustrating storage orchestrator 110 according to one embodiment of the invention. As discussed above, storage orchestrator 110 may provide data access services. To provide data access services, storage orchestrator 110 may include data manager 200 and storage 210.

Data manager 200 may (i) service data access requests and (ii) maintain information regarding storage providers that may be used to service the data access requests. To service the data access requests (e.g., storage and/or read requests), data manager 200 may perform all, or a portion, of the methods illustrated in FIGS. 4-5. To maintain information regarding the storage providers, data manager 200 may perform all, or a portion, of the method illustrated in FIG. 6.

In one embodiment, data manager 200 is implemented using a hardware device including circuitry. The hardware device may be, for example, a digital signal processor, a field programmable gate array, or an application specific integrated circuit. The circuitry may be adapted to cause the hardware device to perform the functionality of data manager 200. Data manager 200 may be implemented using other types of hardware devices without departing from the invention.

In one embodiment, data manager 200 is implemented using a processor adapted to execute computing code stored on a persistent storage that when executed by the processor performs the functionality of data manager 200 discussed throughout this application. The processor may be a hardware processor including circuitry such as, for example, a central processing unit or a microcontroller. The processor may be other types of hardware devices for processing digital information without departing from the invention.

Figure 3:
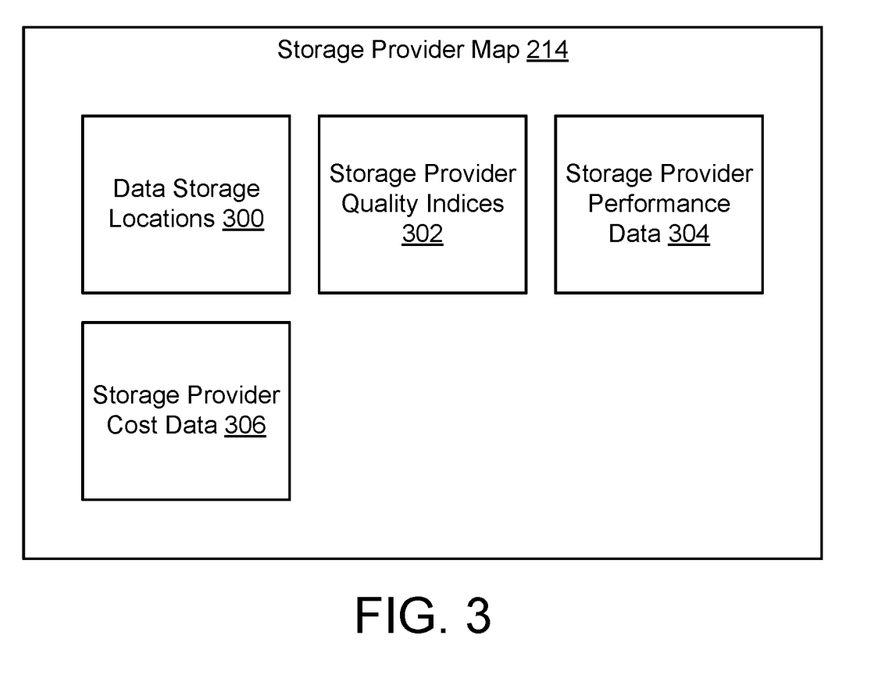
FIG. 3 is a block diagram illustrating a storage provider map according to one embodiment.
Figure 4:
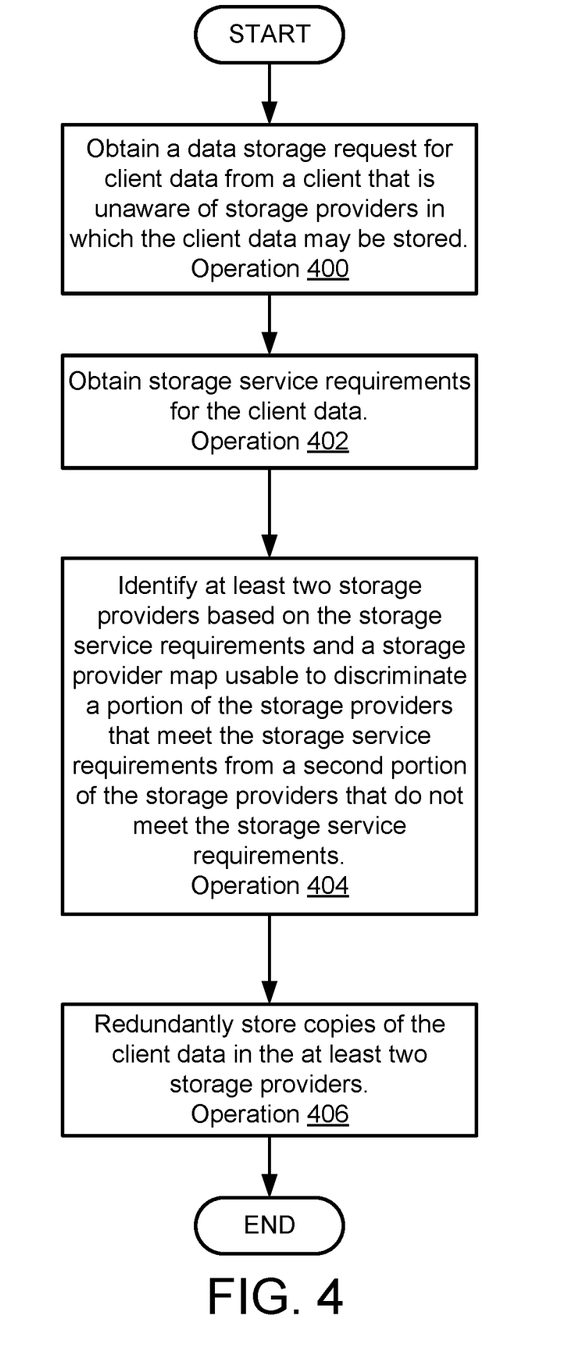
FIG. 4 is a flow diagram illustrating a method of storing client data according to one embodiment.
Figure 5:
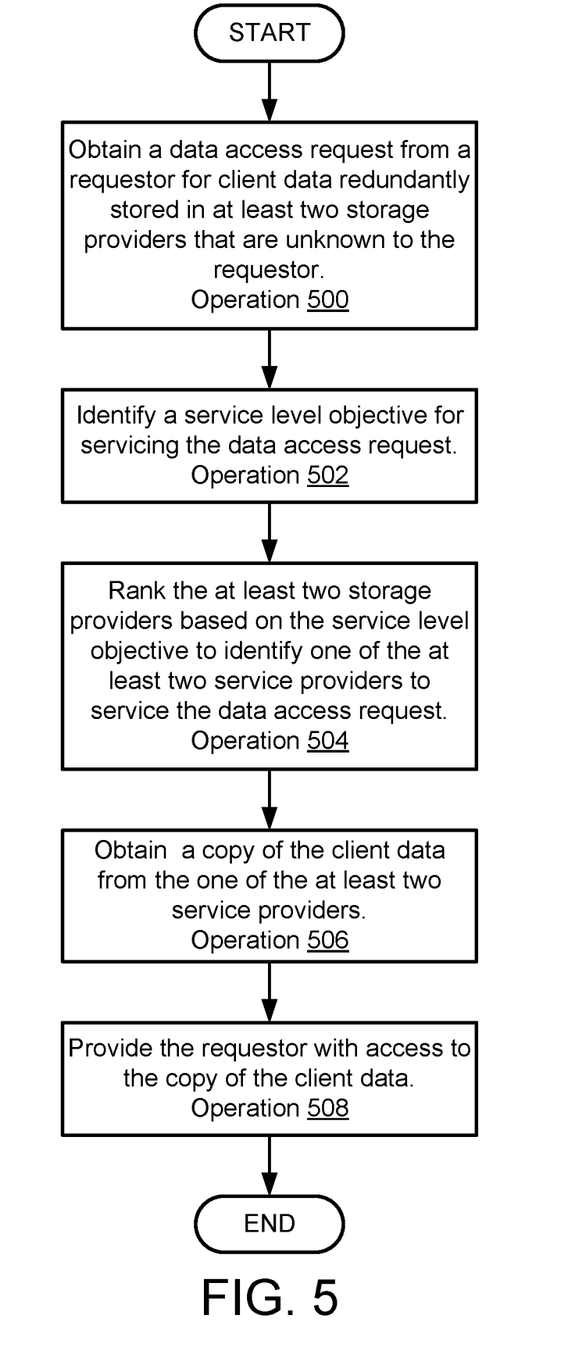
FIG. 5 is a flow diagram illustrating a method of accessing stored client data according to one embodiment.

When performing the method illustrated in FIGS. 3-5, data manager 200 may store data in storage 210.

In one embodiment, storage 210 is implemented using physical devices that provide data storage services (e.g., storing data and providing copies of previously stored data). The devices that provide data storage services may include hardware devices and/or logical devices. For example, storage 210 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 210 may include a memory device (e.g., a dual in line memory device) in which data is stored and from which copies of previously stored data are provided. In another example, storage 210 may include a persistent storage device (e.g., a solid-state disk drive) in which data is stored and from which copies of previously stored data is provided. In a still further example, storage 210 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 210 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 210 may store data structures including service requirements repository 212 and storage provider map 214. Each of these data structures is discussed below.

Service requirements repository 212 may be implemented using at least one data structure that includes information regarding data access goals. The data access goals may specify the minimum expectations regarding the data access services that are to be provided to data storage/access requests.

For example, service requirements repository 212 may include information regarding service level agreements that govern how quickly and/or at which level of cost data is to be stored in storage providers. Different devices (e.g., clients) may have different data access goals. Additionally, service requirements repository 212 may include information regarding how many copies of data should be automatically replicated when a client requests data be stored, where such data may be stored (e.g., in specific tiers, locations, providers owned by particular organizations or public, etc.), and/or other preferences that my dictate where and/or how data from clients (and/or other entities) should be stored in storage providers.

Service level agreements may specify different types of requirements for servicing data access and/or storage requests. Examples of service level agreements include: (i) always perform reads from the fastest storage provider, (ii) always perform reads from the least costly storage provider, (iii) select reads by balancing both read time and read cost, and (iv) always perform reads from the storage provider having the lowest latency (e.g., for fast, frequent access). Similar service level agreements may be applicable to storage requests. Any number and type of service level agreements may be associated with respective users, devices, entities, etc.

In one embodiment, service requirements repository 212 is implemented as a lookup data structure that associates identities with various users, devices, organizations, etc. with the minimum expectations regarding the data access services. When an identity is looked up, the lookup data structure may specify one or more of: (i) a maximum duration of time for storing data, (ii) a maximum duration of time for reading data, (iii) a maximum allowable latency for storing data (e.g., a maximum storage latency), (iv) a maximum allowable latency for reading data (e.g., a maximum access latency), (v) a maximum cost (e.g., a rate) for storing data, and (vi) a maximum cost for reading data. The lookup data structure may specify different and/or additional information without departing from embodiments of the invention.

Storage provider map 214 may be implemented using at least one data structure that includes information regarding (i) where data is stored in storage providers and/or information regarding the storage providers (e.g., locations, storage tiers, owners, etc.), (ii) performance characteristics of the storage providers, (iii) cost characteristics of the storage providers, and/or (iv) rankings of the storage providers with respect to one another. For additional details regarding storage provider map 214, refer to FIG. 3.

The data structures stored in storage 210 may be implemented using, for example, lists, tables, unstructured data, databases, etc. While illustrated in FIG. 2 as being stored locally, the data structures may be stored remotely and may be distributed across any number of devices without departing from embodiments of the invention.

While illustrated in FIG. 2 as included a limited number of specific components, storage orchestrator 110 may include fewer, additional, and/or different components without departing from embodiments of the invention.

FIG. 3 is a block diagram illustrating storage provider map 214 according to one embodiment of the invention. As discussed above, storage provider map 214 may include information regarding storage providers. Specifically, storage provider map 214 may include data storage locations 300, storage provider quality indices 302, storage provider performance data 304, and storage provider cost data 306.

Data storage locations 300 may specify in which storage providers different portions of data are stored. Data storage locations 300 may be implemented using bit maps corresponding to each portion of data. Each bitmap may include a bit corresponding to each storage provider. When a copy of corresponding data is stored in a storage provider, the bit corresponding to the storage provider may be set. For example, if four storage providers are available and copies of data are redundantly stored in the second and fourth storage provider, then a bit map of "0101" may be used to represent the storage locations of the redundantly stored data.

Data storage locations 300 may also specify in which tier of storage the portion of data are stored. To do so, the bit maps may include additional bits to represent the tier system implemented by the respective storage providers thereby enabling such information to also be stored in data storage locations 300.

Storage provider quality indices 302 may specify rankings of the storage providers with respect to one another. Storage provider quality indices 302 may include multiple indexes corresponding to different dimensions of comparison. The dimensions of comparison may include, for example, data storage rates (e.g., gigabytes per second), data read rates, data storage latency (e.g., number of milliseconds before a storage will begin after requested), data read latency, data storage cost, and data read cost. The specified rankings may be on an absolute basis or a relative basis and may include a performance index (i.e., a relative ranking of the data storage/read performance of the storage providers), an archived performance index (i.e., a relative ranking of the data storage/read performance of the storage providers for archived data), and a cost index (i.e., a relative ranking of the cost for storing/reading data in the storage providers). For example, each of the storage providers may be scored on each dimension on a scale of 1 to 100 thereby allowing for relative comparisons using the performance index, archive performance index, and/or cost index. The information included in storage provider quality indices 302 may be derived from the information included in storage provider performance data 304 and/or storage provider cost data 306.

Storage provider performance data 304 may specify the read and/or write performance of the storage providers. Additionally, storage provider performance data 304 may include statistical analysis (e.g., average, mean, median, mode, etc.) of the performance of the storage providers over time.

Storage provider cost data 306 may specify the read and/or write cost of the storage providers. Such information may be provided by the storage providers and/or may be identified by the storage orchestrator by reading and/or writing data and analyzing corresponding cost information for the read and/or written data. Storage provider cost data 306 may include such information on a granular level. For example, storage provider cost data 306 may specify separate information for different tiers (e.g., storage, archive, etc.) of storage provided by different storage provided.

Storage orchestrator may update the information included in storage provider map 214 over time.

Figure 6:
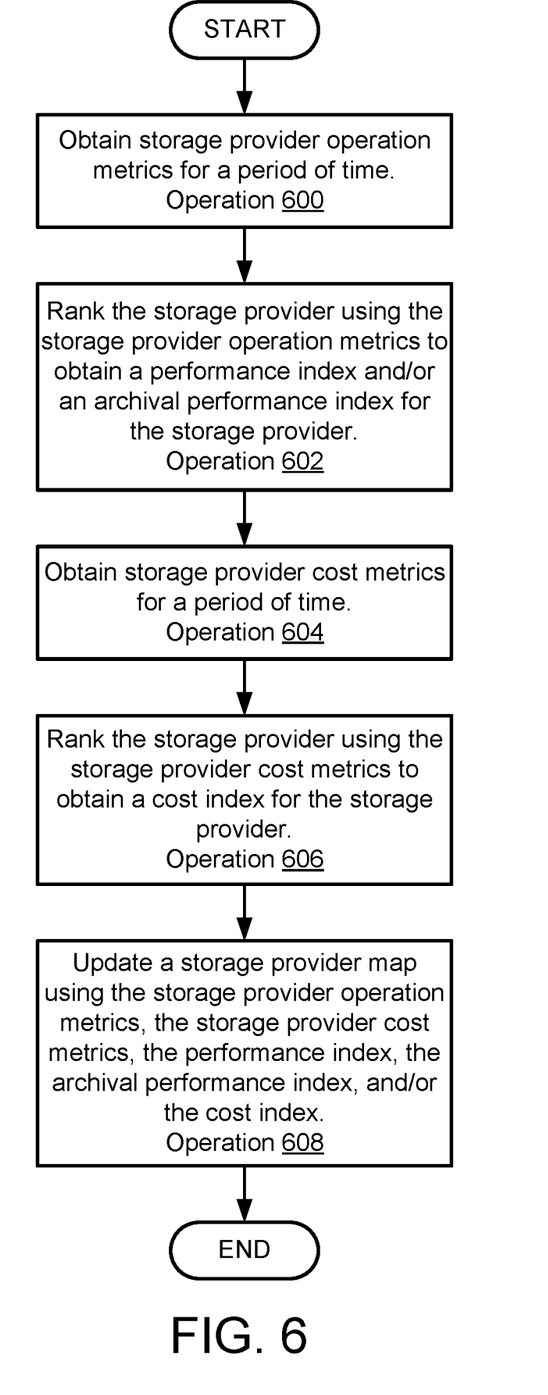
FIG. 6 is a flow diagram illustrating a method for maintaining a storage provider map according to one embodiment.

Turning to FIGS. 4-6, these figures are flow diagrams of methods that may be performed by components of the system of FIG. 1. In the following diagrams, any of the operations may be repeated, performed in different orders, and/or performed in parallel with or a partially overlapping in time manner with other operations.

FIG. 4 is a flow diagram illustrating a method of servicing data storage requests according to one embodiment.

At operation 400, a data storage request for client data from a client that is unaware of storage providers in which the client data may be stored is obtained. The data storage request may not specify where the client data is to be stored. The client data may include any type and quantity of data.

In one embodiment, the client data includes backup data usable to perform a restoration for the client.

In one embodiment, the data storage request is obtained from a message. The message may include the request. The data storage request may be obtained via other means.

At operation 402, storage service requirements for the client data are obtained. The storage service requirements may be obtained by performing a lookup in the service requirements repository 212 using an identity of the client as the key. The lookup may return the storage service requirements.

The storage service requirements may specify one or more metrics for the data access services to be provided by the storage orchestrator. The metrics may include one or more of: (i) a maximum duration of time for servicing the request, (ii) a minimum amount of bandwidth that must be available for servicing the request, (iii) a maximum latency for servicing the request, (iv) a maximum cost for servicing the request, and/or (v) a replication level (e.g., number of copies of data that must be stored in different storage provers, fault zones, geographic regions, storage providers owned by different entities, etc.). These metrics may be requirements that must be met in order to meet service level agreements, policies that define levels of data replication, and/or other policies that govern the services to be provided to user, devices, etc.

In one embodiment, the requirements for the data access services are specified using absolute values, relative values, goals (e.g., minimize cost) rather than hard lines, or other definitions. Different requirements may be specified using different definitions.

For example, the storage service requirements associated with a user may specify that a specific quantity of bandwidth must be available for servicing the data access request and that the cost of the data access is to be minimized.

In second example, the storage service requirements associated with a second user may specify that the cost for the data access must be less than a predetermined amount and that the latency for access is to be minimized.

In operation 404, at least two storage providers are identified based on the storage service requirements and a storage provider map. The storage provider map may be usable to discriminate a portion of the storage providers that meet the storage service requirements from a second portion of the storage service providers that do not meet the storage service requirements.

In one embodiments, the at least two storage providers are identified by (i) identifying a controlling metric (e.g., a metric that must be met to be considered rather than merely optimized for) specified by the storage service requirements, (ii) identifying a portion of the at least two storage providers that meet the controlling metric; and (iii) ordering the portion of the at least two storage providers based on non-controlling metrics (e.g., metrics that do not need to be met to be considered but are to be optimized) of the service level objective. The top service providers identified by the ordering meeting replication level requirements may be used to redundantly store copies of the data (e.g., may be identified as the at least two storage providers). The controlling metric may specify a minimum characteristic of a storage provider that must be met to meet the service level objective. The non-controlling metrics may specify characteristics of the storage provider that impact a quality of the service that the storage provider provide for servicing the data access request.

For example, consider a scenario in which the storage service requirements for a user that has submitted a data access request to store client data specify (i) a minimum bandwidth of 10 gigabytes per second, (ii) the cost for data access is to be minimized, and (iii) a replication level of 2. Further, four storage providers may be available having the following characteristics: first storage provider—8 gigabytes per second, $0.02 to perform the data access; second storage provider—12 gigabytes per second, $0.08 to perform the data access; third storage provider—25 gigabytes per second, $0.12 to perform the data access; and fourth storage provider—15 gigabytes per second, $0.08 to perform the data access. In this example, the controlling metric is the minimum bandwidth resulting in the portion of the storage providers excluding the first storage provider because its bandwidth falls below the minimum required by the controlling metric. The remaining storage providers are then ordered based on the non-controlling metric (in this case the cost for the data access) resulting in second storage provider being ordered first (e.g., due to it having the lowest cost for performing the data access), fourth storage provider being ordered second, and third storage provider being ordered third (e.g., because it has the highest cost even though it has the highest available bandwidth for servicing the data access request). To service the data access request, copies of the client data may be stored in the second and fourth storage providers to meet the replication level requirement. While discussed in this example with respect to a limited number of metrics, more metrics may be used to define the ordering. For example, any of the indices discussed with respect to FIG. 3 may be used to define the ordering, may be used to break ties to define the ordering, or may be used directly to define the ordering.

In the event that multiple metrics are to be optimized, an objective function used to order the storage providers may be formed. The objective function may take, as input, the characteristics of the storage providers corresponding to the multiple metrics and output a numerical value usable to order the storage providers with respect to one another. The objective function may take any form with similar or different weights being given to respective characteristics of the storage providers. For example, an object function may be f(bandwidth, cost)=(A*cost)/(B*bandwidth) where A and B and weights defined by, for example, an administrator, a service level objective, a policy, storage service requirements, or via other methods.

In operation 406, copies of the client data are redundantly stored in the at least two storage providers. The copies of the client data may be redundantly stored by queueing or otherwise initiating storage of the client data in the aforementioned storage providers.

The storage orchestrator may monitor the storage process and update the storage provider map (e.g., to specify in which storage providers/storage tiers the copies of the client data are stored) when the copies have been successfully stored. By doing so, the system may maintain information usable to rapidly evaluate and respond to data access requests. Doing so may better enable the system to meet service level requirements by avoiding time/processing overhead associated with selecting from where to read data after it is stored.

In the event that the attempts to store the client data fail (e.g., due to an error or other event), then the storage orchestrator may reattempt to store the client data. When doing so, the storage orchestrator may attempt to store the copies of the client data in other storage providers (e.g., in accordance with the ordering by selecting the next best storage provider in the order) if a storage provider that failed to store a copy of the client data appears to be inoperable, is unresponsive, or is otherwise unlikely to be able to successfully store copies of data.

The storage orchestrator may also take other actions such as, for example, logging the failed data storage attempts, notifying administrators or other persons of the storage attempt failures, etc.

When storing the client data, the storage orchestrator may instantiate multiple process instances corresponding to each of the respective storages to separately manage the process of storing the respective copies of the client data. The storage orchestrator may act responsively to the completion of these processes by, for example, updating the information regarding where copies of the client data are stored or take remedial action in the event that a process fails to complete such as restarting the process, as discussed above.

The method may end following operation 406.

After the client data is stored in the storage providers, the system may continue to monitor its storage location and update its information regarding where it is stored. For example, archival processes or other processes may move data over time. Thus, the client data may not continue to be stored at the same location (e.g., tier, storage provider) over time. The storage locations may be monitored at a macro level (e.g., file level) or at different levels of granularity (e.g., block/container/etc. level).

If the storage orchestrator identifies that a movement of data has failed, it may automatically remediate the situation by duplicating a copy of the data from another location to the location (or another location) to which the copy failed to move. Since multiple copies are redundantly stored, a single movement failure may not result in data loss so long as the data orchestrator acts to make additional copies in response to a data movement failure.

The storage orchestrator may take other remedial actions in response to continued movement failure such as, for example, generating logs, notifying administrators, storing copies of the data in other locations, etc. that may reduce the likelihood of losing all access to the data in storage providers.

FIG. 5 is a flow diagram illustrating a method of servicing data access requests according to one embodiment.

In operation 500, a data access request from a requestor for client data redundantly stored in at least two storage providers that are unknown to the requestor are obtained. The data access request may not specify where the client data is stored. In one embodiment, the client data includes backup data usable to perform a restoration for the requestor. In one embodiment, the data access request is obtained from a message. The message may include the request. The data access request may be obtained via other means.

The at least two storage providers may be identified using data storage locations specified by the storage provider map 214 of FIG. 3. As discussed, the storage provider map may specify the storage locations, storage tiers, access information, and/or other information usable to identify where copies of the client data are stored.

In operation 502, a service level objective for servicing the data access request is identified. The service level objective may be obtained by performing a lookup in the service requirements repository 212 using an identity of the requestor as the key. The lookup may return one or more metrics that define the service level objective.

The metrics may include one or more of: (i) a maximum duration of time for servicing the request, (ii) a minimum amount of bandwidth that must be available for servicing the request, (iii) a maximum latency for servicing the request, and (iv) a maximum cost for servicing the request.

In one embodiment, the metrics are specified using absolute values, relative values, goals (e.g., minimize cost) rather than hard lines, or other definitions. Different metrics may be specified using different definitions.

In operation 504, storage providers are ranked based on the service level objective to identify one of the at least two service providers to service the data access request.

In one embodiments, the at least two storage providers are ranked by (i) identifying a controlling metric (e.g., a metric that must be met to be considered rather than merely optimized for) specified by the service level object, (ii) identifying a portion of the at least two storage providers that meet the controlling metric; and (iii) ordering the portion of the at least two storage providers based on non-controlling metrics (e.g., metrics that do not need to be met to be considered but are to be optimized) of the service level objective. The top storage provider identified by the ordering may be used to service the data access request.

For example, consider a scenario in which the service level objective for a user that has submitted a data access request to read client data specifies (i) a maximum cost of $0.05 for servicing the data access request, and (ii) the performance index is to be minimized. Further, three storage providers store copies of the client data having the following characteristics: first storage provider—performance index of 3 out of 100 with lower being better, $0.06 to perform the data access; second storage provider—25 out of 100, $0.01 to perform the data access; and third storage provider—10 out of 100, $0.02 to perform the data access. In this example, the controlling metric is the access cost resulting in the portion of the storage providers excluding the first storage provider because its cost falls above the maximum required by the controlling metric. The remaining storage providers are then ordered based on the non-controlling metric (in this case the performance). This results in the third storage provider being ordered first and the second storage provider being ordered second even though the third storage provider has a higher cost for servicing the data access request than the second storage provider. Consequently, the third storage provider is identified as the one of the at least two storage providers. While discussed in this example with respect to a limited number of metrics, more metrics may be used to define the ordering. For example, any of the indices discussed with respect to FIG. 3 may be used to define the ordering, may be used to break ties to define the ordering, or may be used directly to define the ordering.

In the event that multiple metrics are to be optimized, an objective function used to order the storage providers may be formed. The objective function may take, as input, the characteristics of the storage providers corresponding to the multiple metrics and output a numerical value usable to order the storage providers with respect to one another, as previously discussed with respect to FIG. 4.

In operation 506, a copy of the client data is obtained from the one of the at least two service providers. The copy may be obtained by reading it, requesting that a copy be provided, obtaining access information (e.g. identifiers or other information) usable to read the client data from the storage provider, or via other means.

In one embodiment, a storage provider may become inaccessible while providing a copy of the client data to the storage orchestrator (or another entity). In such a scenario, the storage orchestrator may initially copy a first portion of data blocks (e.g., units of data corresponding to any quantity(s)) corresponding to the client data from storage provider; prior to completing the copy of the client data and after copying the first portion of the data blocks, making a determination that the storage provider has become inaccessible (e.g., by no longer receiving data blocks from the storage provider); in response to the determination, using the ranking of the storage providers to identify a second storage provider; copying a second portion of data blocks corresponding to the client data from the second storage providers; and reconstructing the client data using the first portion of the data blocks and the second portion of the data blocks. Thus, the storage orchestrator may utilize storage blocks from multiple sources to service data access requests. In one embodiment, rather than only reading the second portion of the data blocks from the second storage provider, all of the first portion and the second portion of the blocks are read from the second storage provider.

In operation 508, the requestor is provided access to the copy of the client data. The access may be provided by sending a copy of the client data to the requestor, enabling the requestor to read the copy of the client data obtained by the requestor, enabling the requestor to read the copy of the client data from the storage provider (e.g., by providing the access information for the client data to the requestor), or via other means. The requestor may be enabled to read the copy by, for example, providing the requestor with storage location information for the copy of the client data usable to read the copy of the client data from the storage location.

The method may end following operation 508.

FIG. 6 is a flow diagram illustrating a method of maintaining a storage provider map according to one embodiment.

In operation 600, storage provider operation metrics for a period of time are obtained. The operation metrics may include, for example, the bandwidth available to the storage provider, latency for access the storage provider, and/or other operational characteristics of the operation of the storage provider. The metrics may be obtained by, for example, measuring them by sending data access/storage requests to the storage provider and recording the responses, reading them from a source, being provided them from another entity, or via other methods.

In operation 602, the storage provider is ranked using the storage provider operation metrics to obtain a performance index and/or an archival performance index for the storage provider. The ranking may be obtained by comparing the storage provider operation metrics to those of other storage providers. The comparison may then be used to identify the ranking of the storage provider on a scale. The scale may be absolute, relative, or of another type. For example, the ranking may be on a 100-point scale with lower values being better. The ranking may indicate that other storage providers having higher rankings are less able to service storage/access requests while other storage providers having lower rankings are better able to service storage/access requests.

The storage provider may be ranked with respect to the multiple tiers of storage that it may offer. For example, general storage may be ranked with respect to a performance index while archival storage may be ranked with respect to an archival performance index (e.g., because different storage tiers may have different metrics by virtue of the relative importance ascribed to these tiers by the storage providers and corresponding commitment of computing resources for servicing storage/access requests impacting the respective tiers).

The storage proper operation metrics may also be statistically analyzed to identify, for example, the average performance of the storage providers.

In operation 604, storage provider cost metrics for a time period are obtained. The storage provider cost metrics may include, for example, the cost for storing and/or access data in respective storage tiers. The storage provider cost metrics may be obtained by, for example, measuring them by sending data access/storage requests to the storage provider and recording the cost for servicing the requests, reading them from a source (e.g., a listing provided by, for example, a public cloud provider), being provided them from another entity, or via other methods.

In one embodiment, each of the storage providers publishing pricing catalogs (e.g., data structures) that specify the costs for storing data, reading data, and/or otherwise using functionality of the storage providers. The pricing catalogs may be accessible via a REST application programming interface or other mechanism. A storage orchestrator may maintain the accuracy of the obtained storage provider cost metrics by, for example, re-reading the storage provider cost metrics from the published pricing catalogs over time (e.g., monthly, bi-monthly, weekly, daily, or at a rate that is likely to ensure that the storage orchestrator has up to date information).

In one embodiment, the storage provider cost metrics are treated as having no cost for reading/storing data using storage providers that are privately owned by the utilizer.

In one embodiment, separate storage provider cost metrics are obtained for read and storing data, respectively. Further, separate storage provider cost metrics may be obtained for different storage tiers (e.g., prioritized, general, economical, archival) provided by the storage providers.

In operation 606, the storage provider is ranked using the storage provider cost metrics to obtain a cost index for the storage provider. Multiple cost indexes may be obtained reflecting the separate costs for storing data in respective tiers and/or reading data in respective tiers. The rankings may be obtained by comparing the storage provider cost metrics to those of other storage providers. The comparison may then be used to identify the ranking of the storage provider on a scale. The scale may be absolute, relative, or of another type. For example, the ranking may be on a 100-point scale with lower values being better. The ranking may indicate that other storage providers having higher rankings are costlier to service storage/access requests while other storage providers having lower rankings are less costly to service storage/access requests.

In operation 608, a storage provider map is updated using the storage provider operation metrics, the storage provider operation cost metrics, the performance index, the archival performance index, and/or the cost index. As discussed with respect to FIG. 3, the storage provider map 214 may store information reflecting these quantities to enable the system of FIG. 1 to decide how to service data storage and/or data access requests. The storage provider map may be updated by modifying the storage provider map to include information reflecting these quantities.

The storage provider map may be duplicated in both persistent storage and memory to enable quick access during operation while preserving the contents of the storage provider map (e.g., a copy of the storage provider map in persistent storage may be loaded into memory upon restart, failure recovery, or for other purposes).

The method may end following operation 608.

The method shown in FIG. 608 may be performed at any time, at regular or irregular intervals, and/or different portions of the process may be performed at different intervals/times.

Figure 7:
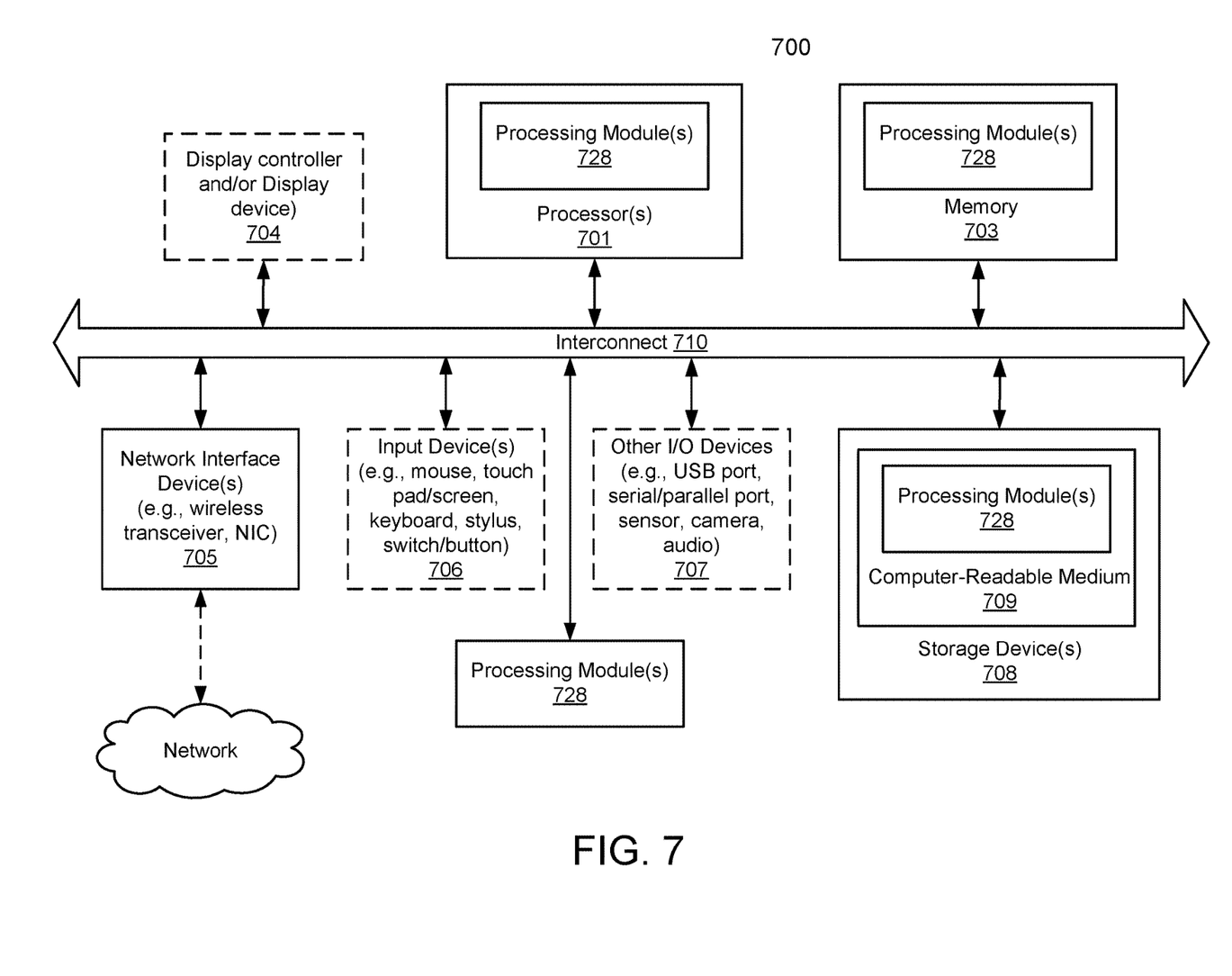
FIG. 7 is a block diagram illustrating a data processing system according to one embodiment.

FIG. 7 is a block diagram illustrating an example of a data processing system (e.g., a computing device) which may be used with one embodiment. For example, system 700 may represent any of data processing systems described above performing any of the processes or methods described above. System 700 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 700 is intended to show a high level view of many components of the computer system. However, it is to be understood that additional components may be present in certain implementations and furthermore, different arrangement of the components shown may occur in other implementations. System 700 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 700 includes processor 701, memory 703, and devices 705-708 via a bus or an interconnect 710. Processor 701 may represent a single processor or multiple processors with a single processor core or multiple processor cores included therein. Processor 701 may represent one or more general-purpose processors such as a microprocessor, a central processing unit (CPU), or the like. More particularly, processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 701, which may be a low power multi-core processor socket such as an ultra-low voltage processor, may act as a main processing unit and central hub for communication with the various components of the system. Such processor can be implemented as a system on chip (SoC). Processor 701 is configured to execute instructions for performing the operations discussed herein. System 700 may further include a graphics interface that communicates with optional graphics subsystem 704, which may include a display controller, a graphics processor, and/or a display device.

Processor 701 may communicate with memory 703, which in one embodiment can be implemented via multiple memory devices to provide for a given amount of system memory. Memory 703 may include one or more volatile storage (or memory) devices such as random access memory (RAM), dynamic RAM (DRAM), synchronous DRAM (SDRAM), static RAM (SRAM), or other types of storage devices. Memory 703 may store information including sequences of instructions that are executed by processor 701, or any other device. For example, executable code and/or data of a variety of operating systems, device drivers, firmware (e.g., input output basic system or BIOS), and/or applications can be loaded in memory 703 and executed by processor 701. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 700 may further include 10 devices such as devices (e.g., 705, 706, 707, 708) including network interface device(s) 705, optional input device(s) 706, and other optional IO device(s) 707. Network interface device(s) 705 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 706 may include a mouse, a touch pad, a touch sensitive screen (which may be integrated with a display device of optional graphics subsystem 704), a pointer device such as a stylus, and/or a keyboard (e.g., physical keyboard or a virtual keyboard displayed as part of a touch sensitive screen). For example, input device(s) 706 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 707 may include an audio device. An audio device may include a speaker and/or a microphone to facilitate voice-enabled functions, such as voice recognition, voice replication, digital recording, and/or telephony functions. Other IO devices 707 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 710 via a sensor hub (not shown), while other devices such as a keyboard or thermal sensor may be controlled by an embedded controller (not shown), dependent upon the specific configuration or design of system 700.

To provide for persistent storage of information such as data, applications, one or more operating systems and so forth, a mass storage (not shown) may also couple to processor 701. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 701, e.g., via a serial peripheral interface (SPI). This flash device may provide for non-volatile storage of system software, including a basic input/output software (BIOS) as well as other firmware of the system.

Storage device 708 may include computer-readable storage medium 709 (also known as a machine-readable storage medium or a computer-readable medium) on which is stored one or more sets of instructions or software (e.g., processing module, unit, and/or processing module/unit/logic 728) embodying any one or more of the methodologies or functions described herein. Processing module/unit/logic 728 may represent any of the components described above, such as, for example, data manager 200 as described above. Processing module/unit/logic 728 may also reside, completely or at least partially, within memory 703 and/or within processor 701 during execution thereof by system 700, memory 703 and processor 701 also constituting machine-accessible storage media. Processing module/unit/logic 728 may further be transmitted or received over a network via network interface device(s) 705.

Computer-readable storage medium 709 may also be used to store some software functionalities described above persistently. While computer-readable storage medium 709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 728, components and other features described herein can be implemented as discrete hardware components or integrated in the functionality of hardware components such as ASICS, FPGAs, DSPs or similar devices. In addition, processing module/unit/logic 728 can be implemented as firmware or functional circuitry within hardware devices. Further, processing module/unit/logic 728 can be implemented in any combination hardware devices and software components.

Note that while system 700 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing data access, the method comprising:
   receiving a data access request from a requestor for client data, wherein the client data was previously redundantly stored in a plurality of storage providers that are unknown to the requestor;
   responsive to receiving the data access request:
      identifying a service level objective for servicing the data access request, wherein the service level objective specifies a controlling metric and a non-controlling metric, the controlling metric comprising a minimum bandwidth to be met by a storage provider;
      determining an operational performance of each of the plurality of storage providers that currently store the client data;

identifying a portion of the plurality of storage providers that meet the controlling metric based on their corresponding operational performance;

ranking, based on the non-controlling metric, only the portion of the plurality of storage providers that currently store the client data, wherein the non-controlling metric is at least based on a cost to access the client data;

identifying a first storage provider from the portion of the plurality of storage providers based on the ranking;

copying a first portion of data blocks corresponding to the client data from the first storage provider;

subsequent to copying the first portion of data blocks corresponding to the client data from the first storage provider, and prior to copying a second portion of data blocks corresponding to the client data, determining that the first storage provider has become inaccessible;

in response to the first storage provider becoming inaccessible, using the ranking of the portion of the plurality of storage providers to identify a second storage provider;

copying the second portion of data blocks corresponding to the client data from the second storage provider; and reconstructing the client data using the first portion of data blocks and the second portion of data blocks to produce reconstructed client data; and providing, to the requestor, access to the reconstructed client data.

2. The computer-implemented method of claim 1, wherein the data access request is a read request.

3. The computer-implemented method of claim 1, wherein the controlling metric specifies a minimum characteristic for accessing the client data that must be met to meet the service level objective.

4. The computer-implemented method of claim 3, wherein the non-controlling metric specifies a characteristic for accessing the client data that impacts a quality of the data access provided to the requestor and for which each of the portion of the plurality of storage providers are relatively ranked with respect to each other.

5. The computer-implemented method of claim 1, wherein ranking the portion of the plurality of storage providers comprises:

generating an objective function based on metrics specified by the service level objective; and ordering the portion of the plurality of storage providers based on the objective function, wherein the data access request is a read request.

6. The computer-implemented method of claim 5, wherein the metrics comprise at least one of a maximum access latency for the client data, a maximum duration of time for accessing the client data, a maximum cost for accessing the client data, a relative performance ranking of the portion of the plurality of storage providers, and a relative archival performance ranking of the portion of the plurality of storage providers, and a relative cost ranking for the portion of the plurality of storage providers.

7. A non-transitory machine-readable medium having instructions stored therein, which when executed by a processor, cause the processor to perform operations for managing data access, the operations comprising:

receiving a data access request from a requestor for client data, wherein the client data was previously redundantly stored in a plurality of storage providers that are unknown to the requestor;

responsive to receiving the data access request:
identifying a service level objective for servicing the data access request, wherein the service level objective specifies a controlling metric and a non-controlling metric, the controlling metric comprising a minimum bandwidth to be met by a storage provider;

determining an operational performance of each of the plurality of storage providers that currently store the client data;

identifying a portion of the plurality of storage providers that meet the controlling metric based on their corresponding operational performance;

ranking, based on the non-controlling metric, only the portion of the plurality of storage providers that currently store the client data, wherein the non-controlling metric is at least based on a cost to access the client data;

identifying a first storage provider from the portion of the plurality of storage providers based on the ranking;

copying a first portion of data blocks corresponding to the client data from the first storage provider;

subsequent to copying the first portion of data blocks corresponding to the client data from the first storage provider, and prior to copying a second portion of data blocks corresponding to the client data, determining that the first storage provider has become inaccessible;

in response to the first storage provider becoming inaccessible, using the ranking of the portion of the plurality of storage providers to identify a second storage provider;

copying the second portion of data blocks corresponding to the client data from the second storage provider; and reconstructing the client data using the first portion of data blocks and the second portion of data blocks to produce reconstructed client data; and providing, to the requestor, access to the reconstructed client data.

8. The non-transitory machine-readable medium of claim 7, wherein the data access request is a read request.

9. The non-transitory machine-readable medium of claim 7, wherein the controlling metric specifies a minimum characteristic for accessing the client data that must be met to meet the service level objective.

10. The non-transitory machine-readable medium of claim 9, wherein the non-controlling metric specifies a characteristic for accessing the client data that impacts a quality of the data access provided to the requestor and for which each of the portion of the plurality of storage providers are relatively ranked with respect to each other.

11. The non-transitory machine-readable medium of claim 7, wherein ranking the portion of the plurality of storage providers comprises:

generating an objective function based on metrics specified by the service level objective; and ordering the portion of the plurality of storage providers based on the objective function, wherein the data access request is a read request.

12. The non-transitory machine-readable medium of claim 11, wherein the metrics comprise at least one of a maximum access latency for the client data, a maximum duration of time for accessing the client data, a maximum cost for accessing the client data, a relative performance ranking of the portion of the plurality of storage providers, and a relative archival performance ranking of the portion of the plurality of storage providers, and a relative cost ranking for the portion of the plurality of storage providers.

13. A data processing system for managing data access, comprising:
a processor; and
a memory coupled to the processor to store instructions, which when executed by the processor, cause the processor to perform operations, the operations comprising:
receiving a data access request from a requestor for client data, wherein the client data was previously redundantly stored in a plurality of storage providers that are unknown to the requestor;
responsive to receiving the data access request:
identifying a service level objective for servicing the data access request, wherein the service level objective specifies a controlling metric and a non-controlling metric, the controlling metric comprising a minimum bandwidth to be met by a storage provider;
determining an operational performance of each of the plurality of storage providers that currently store the client data;
identifying a portion of the plurality of storage providers that meet the controlling metric based on their corresponding operational performance;
ranking, based on the non-controlling metric, only the portion of the plurality of storage providers that currently store the client data, wherein the non-controlling metric is at least based on a cost to access the client data;
identifying a first storage provider from the portion of the plurality of storage providers based on the ranking;
copying a first portion of data blocks corresponding to the client data from the first storage provider;
subsequent to copying the first portion of data blocks corresponding to the client data from the first storage provider, and prior to copying a second portion of data blocks corresponding to the client data, determining that the first storage provider has become inaccessible;
in response to the first storage provider becoming inaccessible, using the ranking of the portion of the plurality of storage providers to identify a second storage provider;
copying the second portion of data blocks corresponding to the client data from the second storage provider; and
reconstructing the client data using the first portion of data blocks and the second portion of data blocks to produce reconstructed client data; and
providing, to the requestor, access to the reconstructed client data.

14. The data processing system of claim 13, wherein the data access request is a read request.

15. The data processing system of claim 13, wherein the controlling metric specifies a minimum characteristic for accessing the client data that must be met to meet the service level objective.

16. The data processing system of claim 15, wherein the non-controlling metric specifies a characteristic for accessing the client data that impacts a quality of the data access provided to the requestor and for which each of the portion of the plurality of storage providers are relatively ranked with respect to each other.

17. The data processing system of claim 13, wherein ranking the portion of the plurality of storage providers comprises:
generating an objective function based on metrics specified by the service level objective; and
ordering the portion of the plurality of storage providers based on the objective function,
wherein the data access request is a read request.

18. The data processing system of claim 17, wherein the metrics comprise at least one of a maximum access latency for the client data, a maximum duration of time for accessing the client data, a maximum cost for accessing the client data, a relative performance ranking of the portion of the plurality of storage providers, and a relative archival performance ranking of the portion of the plurality of storage providers, and a relative cost ranking for the portion of the plurality of storage providers.

* * * * *